(12) United States Patent  (10) Patent No.: US 8,876,455 B2
Pogue  (45) Date of Patent: Nov. 4, 2014

(54) PULL AND LIFT SYSTEM FOR TRANSPORTING ROOFING MATERIALS

(76) Inventor: Richard W. Pogue, St. Peters, MO (US)

( * ) Notice: Subject to any disclaimer, the term of this patent is extended or adjusted under 35 U.S.C. 154(b) by 980 days.

(21) Appl. No.: 12/896,498

(22) Filed: Oct. 1, 2010

(65) Prior Publication Data
US 2011/0064551 A1 Mar. 17, 2011

Related U.S. Application Data

(63) Continuation-in-part of application No. 12/170,808, filed on Jul. 10, 2008, now abandoned, which is a continuation of application No. 11/034,245, filed on Jan. 13, 2005, now abandoned.

(51) Int. Cl.
*B60P 1/02* (2006.01)
(52) U.S. Cl.
CPC .................................... *B60P 1/02* (2013.01)
USPC ............................ 414/496; 414/521; 414/661
(58) Field of Classification Search
USPC ............ 414/10, 11, 349, 351, 400, 495, 509, 414/521, 546, 679, 661, 492, 478
See application file for complete search history.

(56) References Cited

U.S. PATENT DOCUMENTS

| | | | | |
|---|---|---|---|---|
| 3,308,845 A | * | 3/1967 | Bellas et al. | 137/234.6 |
| 3,330,432 A | * | 7/1967 | Blackburn et al. | 414/494 |
| 3,572,563 A | * | 3/1971 | Oliver | 414/514 |
| 4,249,843 A | * | 2/1981 | Kerr | 414/789.7 |
| 4,288,195 A | * | 9/1981 | Brewer | 414/608 |
| 4,409,903 A | * | 10/1983 | Wilhelmsson et al. | 104/162 |
| 4,522,548 A | * | 6/1985 | Oswald et al. | 414/458 |
| 4,725,183 A | * | 2/1988 | Smillie, III | 414/345 |
| 4,778,327 A | * | 10/1988 | Tufenkian et al. | 414/541 |
| 5,016,858 A | * | 5/1991 | Mitchell | 254/45 |
| 5,299,906 A | * | 4/1994 | Stone | 187/275 |
| 5,314,290 A | * | 5/1994 | Lutz et al. | 414/509 |
| 5,328,320 A | * | 7/1994 | Farrow et al. | 414/495 |
| 5,380,140 A | * | 1/1995 | Johnson | 414/421 |
| 5,562,390 A | * | 10/1996 | Christenson | 414/477 |
| 5,662,453 A | * | 9/1997 | Gerstner et al. | 414/812 |
| 5,685,687 A | * | 11/1997 | Frye | 414/505 |
| 6,056,497 A | * | 5/2000 | Holz | 414/492 |

(Continued)

OTHER PUBLICATIONS

The Roar, p. 6, published in 2003 (http://www.nemeon.com/files/nemeon-2003-1.pdf).*

(Continued)

*Primary Examiner* — Saul Rodriguez
*Assistant Examiner* — Glenn Myers
(74) *Attorney, Agent, or Firm* — Charles McCloskey

(57) ABSTRACT

The pull and lift system for transporting roofing materials includes a pull bar upon a flat bed of a truck, two rams connecting to the pull bar, controls for the rams, two pairs of mutually spaced apart legs, a table connecting between the pairs of legs, at least one ram connecting to the table, and controls for this ram. The first controls engage the pull bar against a pallet then draw it towards the table. The pull bar has an L shaped cross section with the lower portion sliding upon the flat bed and the upper portion engaging a pallet. The table has a first position coplanar with the flat bed and a second position above the flat bed and proximate a conveyor. The table elevates, while loaded with cargo, and remains level during its transition from the first position to the second position.

2 Claims, 7 Drawing Sheets

(56) References Cited

U.S. PATENT DOCUMENTS

| | | | |
|---|---|---|---|
| 6,092,973 A * | 7/2000 | Burnett et al. | 414/517 |
| 6,789,829 B1 * | 9/2004 | Kapels | 296/11 |
| 7,104,478 B2 * | 9/2006 | Niemela et al. | 239/672 |
| 2004/0062630 A1 * | 4/2004 | Marrero | 414/589 |
| 2004/0091344 A1 * | 5/2004 | Balkins et al. | 414/495 |
| 2006/0037518 A1 * | 2/2006 | Lopez Alba | 108/145 |

OTHER PUBLICATIONS

Power Concepts Home Page, as published on Jan. 4, 2010 (http://web.archive.org/web/20050104044228/http://www.powerconceptsequipment.com/).*

* cited by examiner

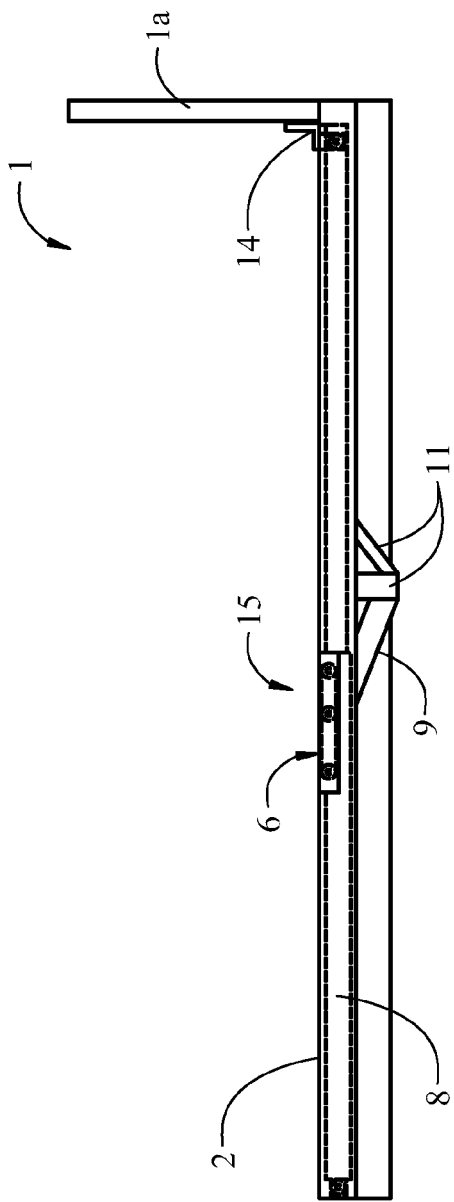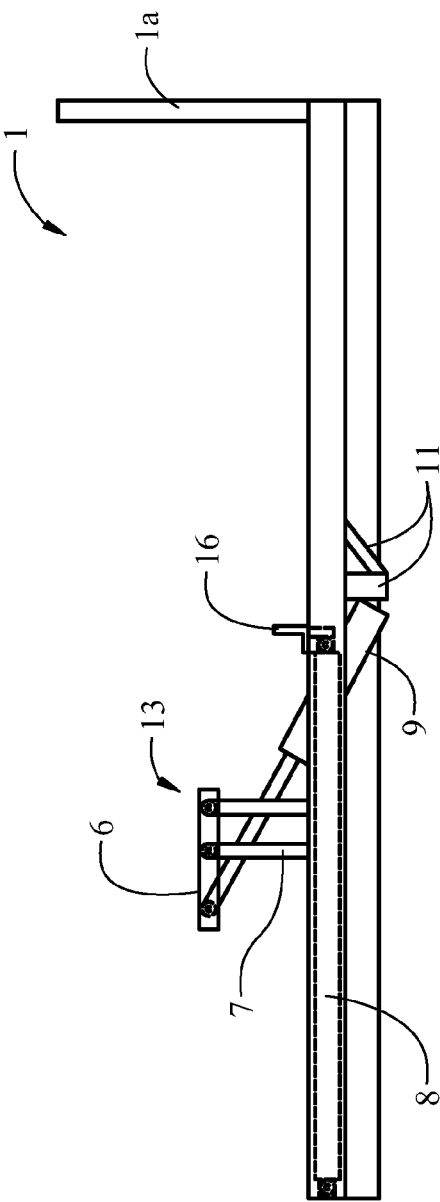

PULL AND LIFT SYSTEM FOR TRANSPORTING ROOFING MATERIALS

CROSS REFERENCE TO RELATED APPLICATION

This continuation in part application claims priority to the pending continuation application having a Ser. No. 12/170,808 with a filing date of Jul. 10, 2008 which claims priority to the abandoned non-provisional application having a Ser. No. 11/034,245 with a filing date of Jan. 13, 2005. These applications are commonly owned by the same inventor.

BACKGROUND OF THE INVENTION

The pull and lift system for transporting roofing materials generally relates to truck bed equipment and more specifically to combined pull bar and lift table operating relative to a truck bed. The present invention provides for efficient pulling of roofing pallets upon a lift table and then timely elevation of the lift table to the base of a pedestal conveyor.

Present day buildings have roofs with various coverings. The coverings is include asphalt shingles, membranes such as EPDM, and tar to name a few. Over time, the covering upon a roof wears from exposure to the elements, hailstorms, activities of birds and animals, errant projectiles, the rare meteorite, and the like. Eventually, a roof requires repair or replacement, often at a five year interval. When a roof calls for repair, the building owner contracts with a roofer to complete the job.

A roofer who arrives at a building sees the roof at the top of the building but the roofer, materials, and crew generally at ground level. To begin, the roofer must place his crew upon the roof to remove the old roof. A roofing crew generally reaches the roof using ladders or access from a building stairwell to the roof. With a roof stripped of its old covering, the roofer next has to bring materials to the level of the roof. Even for a single story house, the roofer must lift tons of roofing shingles at least nine feet to an eave. For two story houses and taller buildings, the roofer must lift and place the new roofing materials at greater heights. Building occupants and owners generally disfavor a roofer walking up stairs carrying the roofing materials, such as tar.

In prior times, roofers climbed ladders carrying packs of shingles over their shoulders to the eave for transfer to another roofer standing on the roof. The roofer then descended the ladder for the next shingle pack. Though possible and practical, this method had a limited capacity of tons per hour loaded upon a roof and put roofers at risk of ladder mishaps. For shorter buildings, roofers have emplaced ramps and walked up to roofs to unload packs of shingles. In recent decades, roofers have brought conveyors to buildings. Early on, the conveyors had their bases upon the ground near the motive power and their ends upon the eave of a building. Roofers then loaded packs of shingles upon the moving conveyor that then deposited the shingles at the eave for other roofers to place. In recent years, roofers have mounted conveyors upon pedestals at the rear of flat bed trucks. Sometimes the roofer owns the truck and more often the roofing supplier owns the truck with a conveyor so mounted. At the roofing supply center, the yard crew loads pallets of roofing materials, and perhaps other construction items, onto the flat bed, generally beneath the lowered conveyor. For bigger jobs, the pallets extend from the headache board just behind the cab rearwardly to the pedestal. The truck then proceeds to a roofing jobsite where it extends its conveyor from the pedestal, outwardly and upwardly, to the eave. A worker upon the truck bed then unloads each pallet of roofing materials by placing packs of shingles onto the conveyor. The worker then lifts a shingle pack onto the conveyor for upward movement to other roofers upon the roof of a building. A worker repeats this until all of the shingles have reached the roof. The worker may have to walk the length of the flat bed many times during the unloading and bend often to place the shingle packs upon the conveyor.

DESCRIPTION OF THE PRIOR ART

Over the years, various devices and machines have sought to improve the transition of shingles from a flat, storage location up to a lifting position and onto a conveyor with less effort for the worker. The U.S. Pat. pub. no. 2004/0091344 to Balkins describes a lifting and moving apparatus placed upon a truck bed. The apparatus rests upon the top of the truck bed and has a lift assembly, proximate the headboard, that raises the lift rail assembly from the support members. The lift rail assembly includes a connecting rail and at least two side rails mutually parallel and spaced apart. The lift assembly has a center rail with a length at least half of the bed length like the other side rails. The center rail runs the risk of colliding with the lift apparatus upon the rear of the truck bed as the lift assembly moves rearward.

U.S. Pat. No. 5,685,687 to Frye provides a loading and unloading assist apparatus for a truck. The apparatus moves palletized materials from the front of a truck bed towards the rear where an operator then loads the materials onto a conveyor. The apparatus has a lift platform upon control arms that has a hydraulic lift cylinder. Frye describes the head end of the cylinder connecting to the frame. However, the present invention has its ram connecting to a strut within the frame rails and beneath the truck bed.

The U.S. Pat. No. 6,056,497 to Holz describes a towed dump wagon, or trailer, for removing potted plants from a trailer. The Holz trailer tilts upwardly so the back of the trailer, away from the tongue, nearly contacts the ground. The tilted trailer enlists gravity to assist in unloading of the plants. Holz also describes a pusher dragged and jerked from the head to the back of the trailer using a chain drive upon each side of the trailer. On the other hand, the present invention has a pull bar upon a flat truck bed that does not tilt and that moves product smoothly unlike the jerky chain drive.

The U.S. Pat. No. 5,562,390 to Christenson describes a handling mechanism of a hydraulically powered frame for lifting, and releasing containers such as truck bodies, notably dumpster trucks. The large truck bodies are hydraulically guided and secured upon the truck chassis. Christenson further teaches of a locking mechanism where hooks enmesh, preventing detachment of a truck body. In contrast, the present invention lacks enmeshing hooks and two position arms upon dual pins.

Then the U.S. Pat. No. 6,092,973 to Burnett provides a large dump truck for earthmoving. Burnett provides a blade shaped to the interior cross section of the dump bed. In contrast, the present invention has a pull bar with at least one flat surface for sliding upon the truck bed and another surface for engaging pallets of roofing materials.

And, the U.S. Pat. No. 4,929,143 to Dohnalik teaches of a quick attach mechanism generally located at the working end of a boom on a rough terrain forklift. The mechanism allows for attachment and detachment of implements, readily upon the boom. In the present invention, the pull bar moves upon the plane of the flat truck bed and no quick attachments are required.

The present invention overcomes the disadvantages of the prior art and provides a pull and lift system for transporting roofing materials that efficiently pulls roofing pallets along a truck bed to a lift table and then timely elevates the lift table to the base of a pedestal conveyor without tipping the pallets on the lift table. The present invention pulls the pallets smoothly under hydraulic action and allows for stopping of a pallet at any position within the range of the pull. The invention also elevates the lift table using spaced apart pairs of legs without scissors like action. The legs beneath the lift table avoid contacting and interfering with the truck frame and other nearby equipment.

SUMMARY OF THE INVENTION

The pull and lift system for transporting roofing materials includes a pull bar resting upon a flat bed of a truck, two hydraulic rams connecting to the pull bar in a spaced apart arrangement and the frame of the truck, and controls for the rams, two pairs of mutually spaced apart legs, a table connecting between the pairs of legs, at least one hydraulic ram connecting to the table and the frame of a truck, and controls for this ram. The first controls engaged the pull bar against a pallet then draw the pull bar towards the table. The pull bar has a generally L shaped cross section with the lower portion sliding upon the flat bed and the upper portion engaging a pallet. The table has a first position generally coplanar with the flat bed and a second position generally above the flat bed and parallel to the flat bed with a location proximate the pedestal of a conveyor. The table elevates, while loaded with cargo, and remains level during its transition from the first position to the second position.

There has thus been outlined, rather broadly, the more important features of the invention in order that the detailed description thereof that follows may be better understood and that the present contribution to the art may be better appreciated. The present invention also transfers roofing materials from a pull bar extended position, as at 14, FIG. 1, located at the headboard 1a of a truck bed 2 to a lift table 6, using hydraulic rams 8. The pull and lift system raises roofing material via the lift table 6 by hydraulic rams 9, shown in FIG. 4, eliminating excessive bending by a worker. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a pull and lift system for transporting roofing materials that draws loaded pallets from the vicinity of the headboard of a flat bed truck rearwardly and then lifts the pallets without tipping to an elevation convenient to a worker.

Another object is to provide such a pull and lift system that has a low cost of manufacturing so the purchasing roofers, roofing suppliers, lumberyards, contractors, government agencies, and organizations can readily buy the pull and lift system through supply sources, and procurement channels.

Another object of the pull and lift system is to transfer pallets of roofing and other construction materials longitudinally and mechanically on a flat truck bed from the pull bar extended position on a truck bed 14, FIG. 1, located at the headboard 1a of the truck bed to the lift table 6, as shown in FIG. 1, through usage of two hydraulic rams 8, as similarly shown.

Another object of the present invention is to lift pallets of roofing and other construction materials vertically from a truck bed with a hydraulic lift table 6 to eliminate excessive bending by the worker picking up the roofing materials.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings,

FIG. 3 is a side view with the lift table 6 at the lowered position 15 at the rear of the truck bed;

FIG. 4 is a side view with the lift table 6 at the elevated position 13 at the rear of the truck bed;

The same reference numerals refer to the same parts throughout the various figures.

DESCRIPTION OF THE PREFERRED EMBODIMENT

Figure 1:
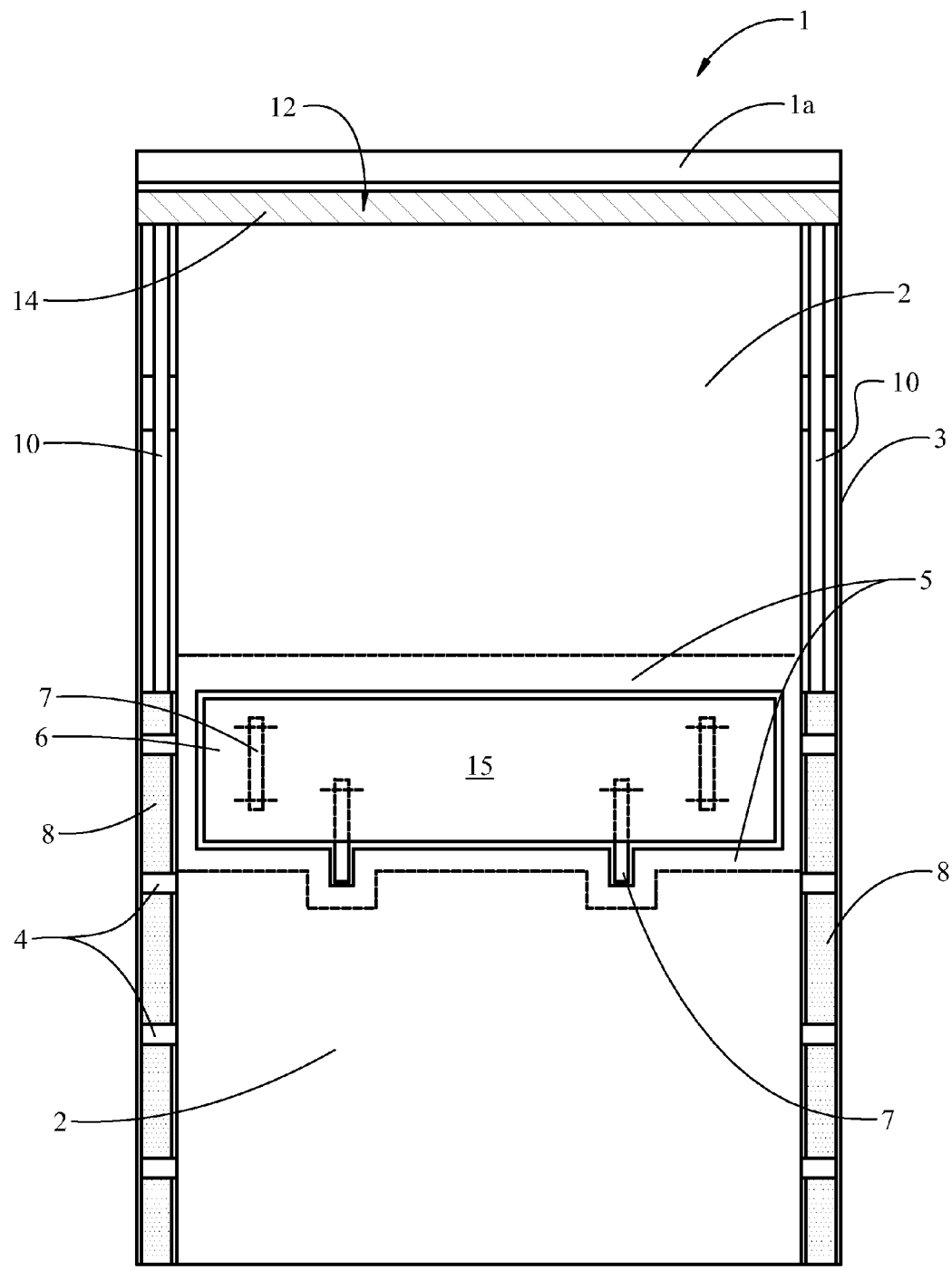
FIG. 1 is a plan view of the pull and lift system of the present invention with the pull bar in extended position.

The present invention overcomes the prior art limitations by providing a pull and lift system for transporting roofing materials that moves pallets of materials rearwardly from the front of a flat bed truck towards a lift table and then up to the base of a pedestal mounted conveyor. The present invention installs upon a flat bed cargo truck. The pull and lift system of the present invention is illustrated in the drawings as at 1. The pull and lift system includes a pull bar 12 upon a bed 2 of a cargo truck (not shown). The pull bar 12 appears in its extended position in FIG. 1 as at 14, and in its retracted position as at 16 later in FIG. 2.

In FIG. 1, the bed 2 has a generally rectangular form with lateral ends and longitudinal sides generally parallel to the direction of movement of the truck. The lateral ends have less length than the longitudinal sides and form the front and the rear of the bed. A headboard 1a joins to the bed 2 proximate one lateral end towards the front of the truck, that is, towards the cab (not shown) and opposite the pedestal mounted conveyor (not shown). Along the longitudinal sides, the bed has two mutually parallel and spaced apart trims 3. The trims have a thin and generally elongated shape and extend along the exterior of the bed as shown. Between the trims and parallel to the lateral ends, the bed has a plurality of spanners 4. The spanners extend beneath the bed 2 and attach to the frame (not shown) of the truck. Beneath the spanners and just inside of the trims, the bed supports two mutually parallel and spaced apart rams 8, preferably hydraulic and alternatively electric. The rams are generally parallel to the direction of movement of the truck. Each ram forcibly extends and retracts a shaft 10 coaxially that connects to the pull bar 12. The pull bar has a generally elongated, slender shape with two spaced apart ends. The ends provide a connection of the pull bar to each shaft. Connecting two shafts to the pull bar as shown allows for even application of pulling force from the pull bar to cargo, such as palletized roofing. The rams 8 operate using controls from an operator's station proximate the pedestal mount of a conveyor.

Within the bed 2, a pattern of safety stripes 5 denote the limits of fixed portions of the bed and the boundary of the lift table 6. The stripes define a rectangular area with two symmetric squared protrusions opposite the headboard. The lift table has a generally rectangular shape that extends substantially across the bed and perpendicular to the direction of movement of the truck. The lift table has its own lateral ends being less than half of the length of its own longitudinal sides. The longitudinal sides of the lift table are perpendicular to the longitudinal sides of the bed. The pull and lift system also includes the lift table 6 shown in its lowered position at 15 in FIGS. 1, 3, and having a its raised position at 13 shown in FIGS. 2, 4. Continuing in FIG. 1, the lift table 6 pivotally connects to four legs 7 beneath the table. Opposite the lift table, each leg connects to the spanners 4 and the frame of the truck as later shown in FIGS. 3-6.

Figure 2:
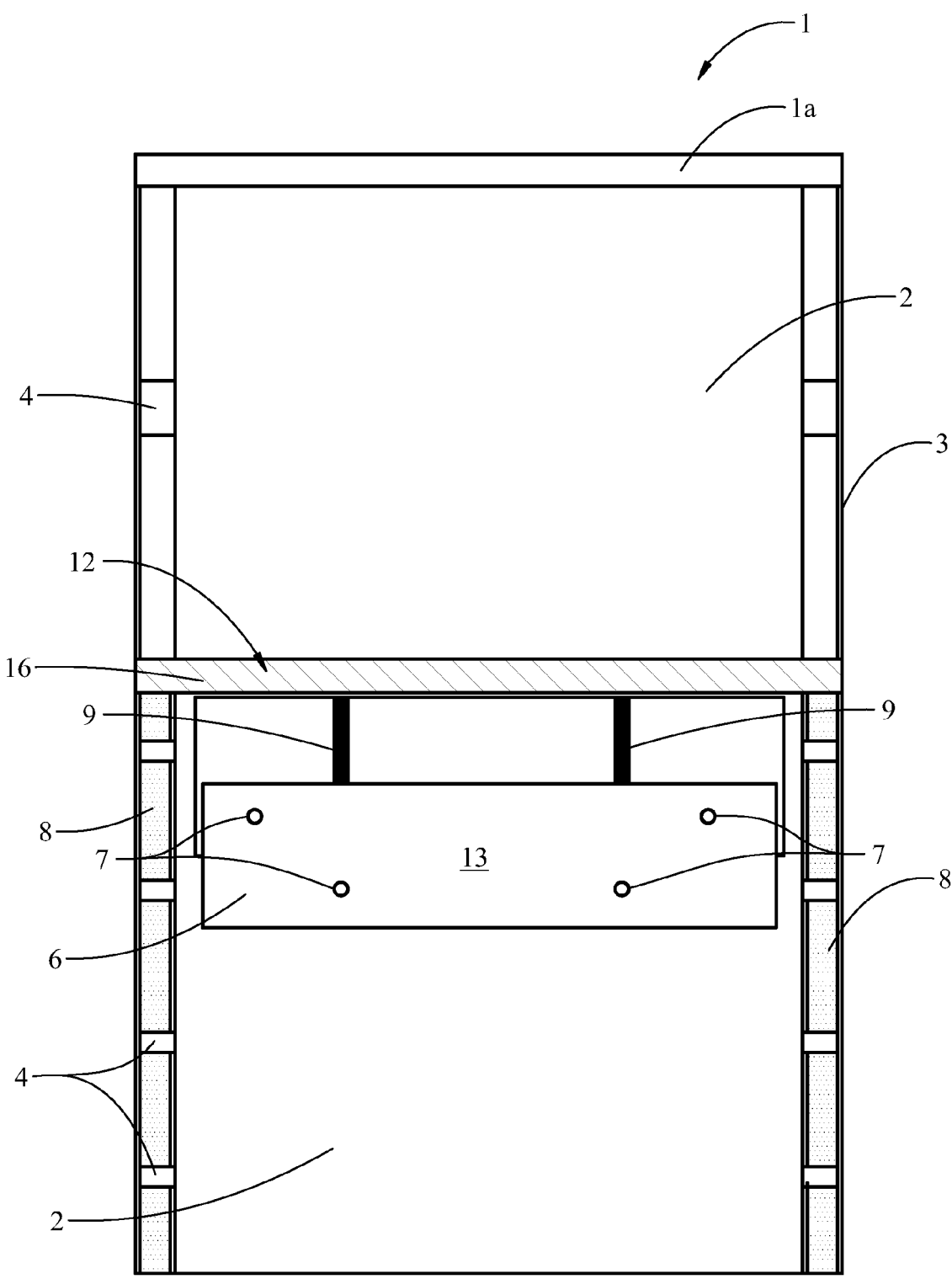
FIG. 2 is a plan view with the pull bar in retracted position.

The pull and lift system has the ability to transfer roofing materials, preferably palletized, from the pullbar extended position 14, FIG. 1, located at the headboard 1a of a truck bed to the lowered lift table 6 as previously shown in FIG. 1 as at 15. The dual hydraulic rams 8 arranged in parallel accomplish the transfer and the transfer ends with the pull bar at its retracted position 16 as shown in FIG. 2. FIG. 2 shows the bed 2, spanners 4, trims 3, and rams 8 as previously described. The pull bar 12 though has moved rearwardly from the headboard 1a and crossed a safety stripe 5 to approach the forward edge of the lift table. The pull bar has attained its retracted position 16 in FIG. 2. Rearwardly from the pull bar, the lift table 6 appears in its raised position 13 generally upward from the bed 2 and away from the headboard 1a. The lift table attains the raised position through operations of second rams 9, preferably hydraulic or alternatively electric, connection to struts and the truck frame as later shown.

FIG. 3 shows the bed 2 of the invention 1 from the side with the headboard 1a to the right. Similar to FIG. 1, the pull bar 12 appears in its extended position as at 14 proximate the headboard. The pull bar has a generally mirror image L shaped cross section as shown with the upright portion of the cross section forward and the flat portion of the cross section parallel to the bed and away from the headboard. This position of the cross section allows the pull bar to grip roofing materials and other cargo, particularly palletized. The pull bar abuts the bottom edge of the cargo and then drags it away from the headboard. The pull bar connects to a shaft 10 at each end and the shaft extends and retracts from a ram 8 as shown inside of the trim 3. The ram generally secures to the lateral end of the bed away from the headboard. Proximate the middle of the bed, a strut 11 descends beneath the bed. The strut has one portion perpendicular to the bed and another portion at an angle from the end of the one portion upwardly back to the bed. The strut in cooperation with the bed forms a generally triangular frame. The strut receives the second rams 9, particularly the non-extending portion of the ram. The second rams have an acute angle orientation beneath the plane of the deck and the rams 8. The second rams 9 connect to the lift table 6 away from the strut. FIG. 3 shows the lift table 6 in its lowered position 15 with the shafts of the rams 9 fully retracted.

Turning to FIG. 4, the rams 8 have retracted their shafts 10 and brought the pull bar 12 rearward and to the edge of the lift table, slightly rearward of the strut 11. In this position, the pull bar has deposited its cargo (not shown) upon the lift table 6 for elevation. To elevate the cargo, an operator extends the shafts of the second rams 9 as shown. In doing so, the rams 9 extend their shafts outwardly, elevating the table and moving it rearwardly upon the two pairs of spaced apart legs 7. The legs generally rotate counterclockwise in this view when elevating the table and clockwise when lowering it. The table generally has legs proximate the center of its lateral ends and legs towards the forward portion of its lateral ends. As can be inferred from the drawings, forward refers to the direction towards the headboard. The shafts of the rams 9 connect to the interior of the lower surface of the lift table. The rams 9 have a pivotal connection to the table and the strut.

Figure 5:
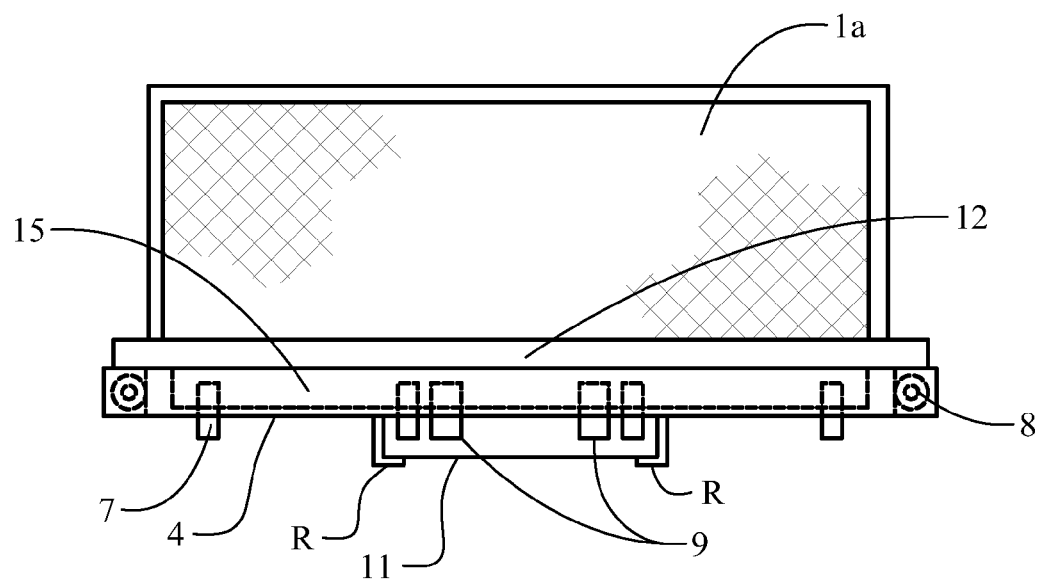
FIG. 5 is an end elevation view with the lift table 6 at the lowered position 15 at the rear of the truck bed.

FIG. 5 then shows the invention 1 in an end view with the headboard 1a in the background and a lateral end of the bed 2 in the foreground. In this view the pull bar 12 generally spans upon the surface of the bed until it reaches the forward edge of the lift table 6 here shown in its lowered position 15. The pull bar moves under power from the rams 8 at each end and here shown located beneath the surface of the bed and generally within the depth of the spanners 4. The lift table rests upon four legs, spaced apart and mutually parallel in a symmetric arrangement. With the lift table in the lowered position, the legs generally rotate to an orientation parallel to the longitudinal sides of the bed. This figure though shows the legs on end and extending slightly below the depth of the spanners. The lowered lift table also has the second rams 9 retracted and having their orientation parallel to the longitudinal sides of the bed. This figure though shows the rams on end and extending slightly below the depth of the spanners. The rams and one pair of legs generally fit within the frame rails R of the truck. Behind the rams 9, the strut 11 spans between the frame rails R as a strong support for the rams when in use.

Figure 6:
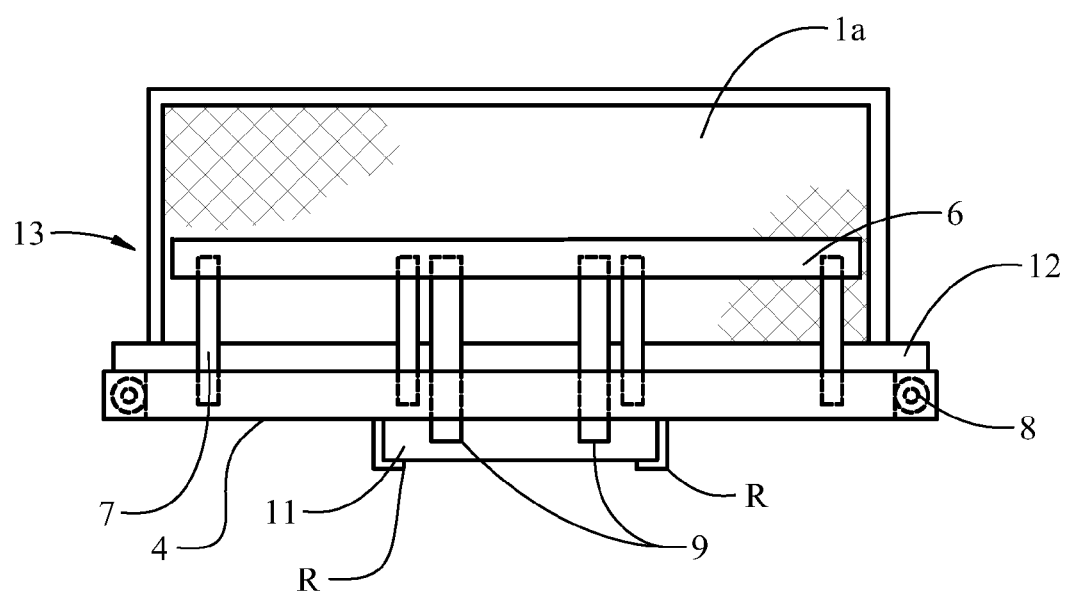
FIG. 6 is an end elevation view with lift table 6 at the elevated position 13 towards the rear of the bed.

Upon command by a worker through controls, the lift table 6 raises to its elevated position as at 13 in FIG. 6. With the headboard 1a, pull bar 12, bed 2, trims 3, rams 8, and spanners 4 as in FIG. 5, the rams 9 have extended their shafts outwardly in FIG. 6. In doing so, the shafts impart an expansive force that lifts and rotates the legs and thus the table so that the table moves rearwardly and upwardly. The rams also produce a reaction force against the strut and its frame like structure absorbs both the horizontal and vertical components of the reaction force into the frame rails R and the bed 2 of the invention. Retraction of the shafts into the rams 9 lowers the table and moves into forward to the pull bar as shown. During lifting and lowering of the table, the table 6 remains level and avoids spilling any cargo placed upon it.

Figure 7:
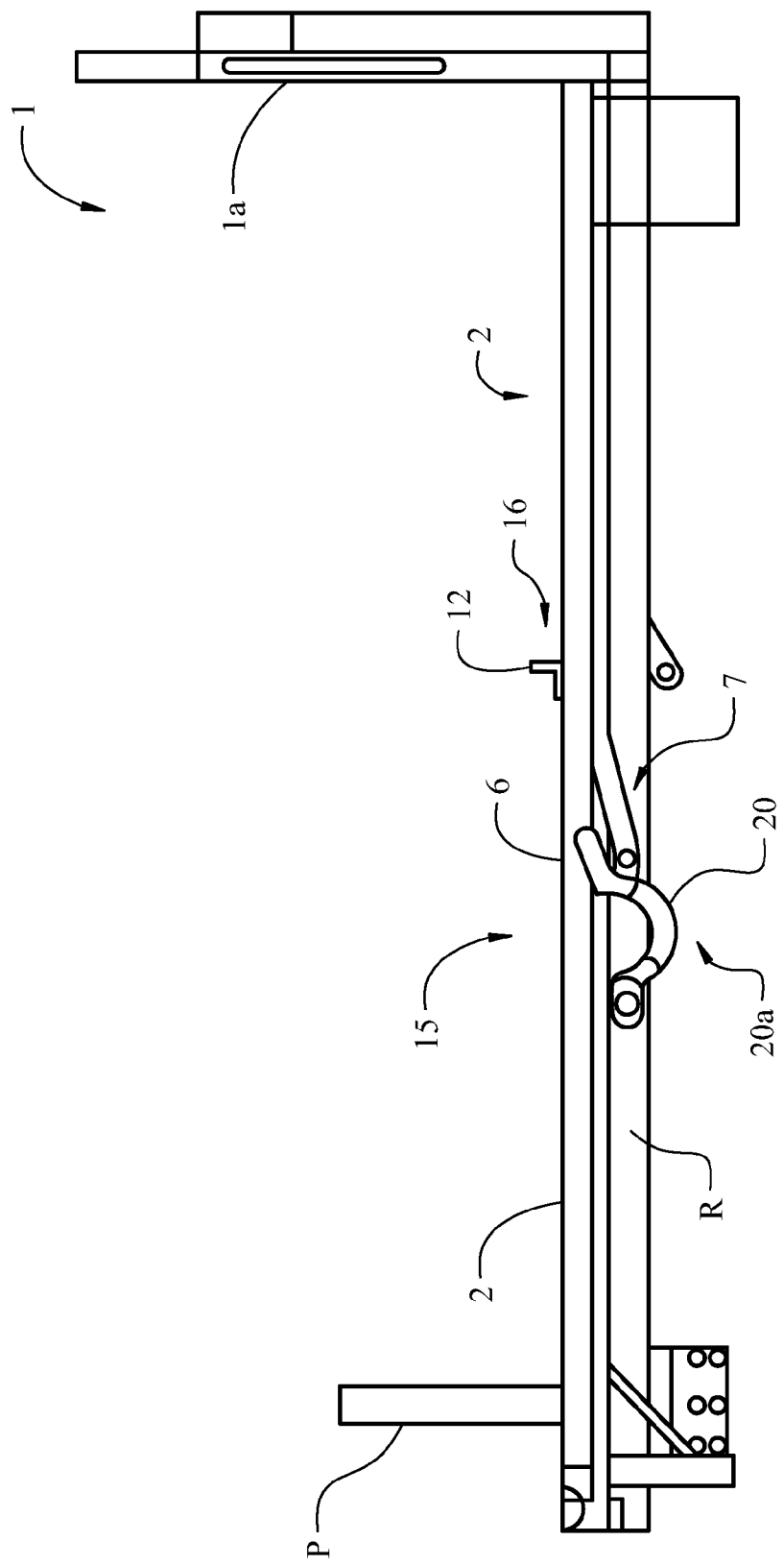
FIG. 7 shows a side view of an alternate embodiment of the invention.

A further alternate embodiment of the invention appears in FIG. 7 in a side view. The invention 1 has its headboard 1a and bed 2 as before. The pull bar 12 has its L shaped cross section and its retracted position 16. Opposite the headboard, the truck has its pedestal mount P for a boom conveyor. Rearwardly from the pull bar, the invention has its lift table 6 shown in the lowered position 15. The lift table 6 has its pairs of legs 7 as before. This embodiment includes a pair of lift arms 20. The lift arms, one shown in this view, have a symmetrical installation upon the frame rails R. The lift arms have a pivoting connection to the lift table and a rotating connection to the frame rails. In this figure, the lift arm 20 has its lowered position as at 20 akin to the lowered lift table 6.

Figure 8:
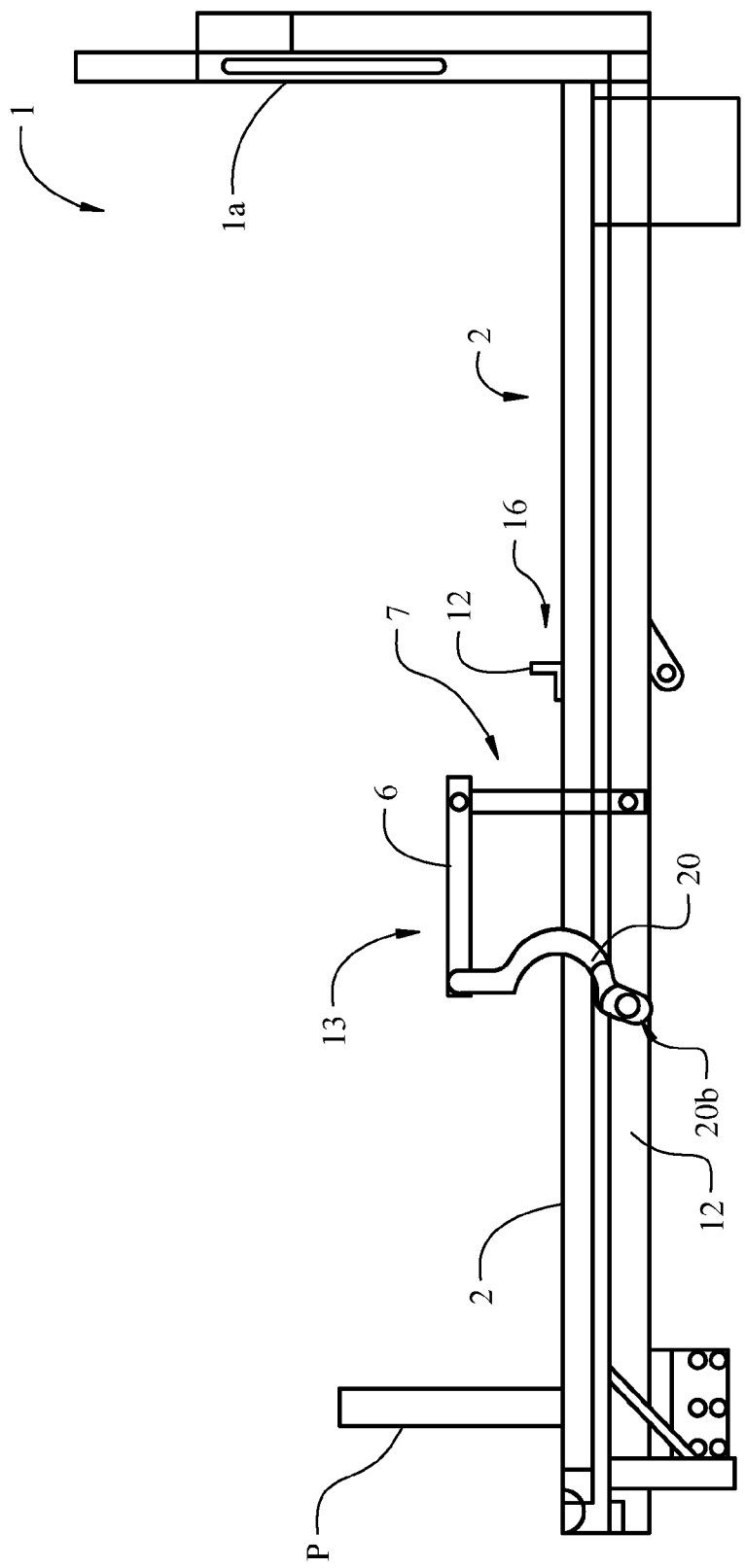
FIG. 8 shows a side view of the lift table raised in the alternate embodiment of FIG. 7; and, FIG. 9 shows a plan view of a lift arm from FIG. 7.

After placing cargo upon the lift table, this further alternate embodiment utilizes the lift arms 20 to elevate the table and move it rearwardly as shown from the side view in FIG. 8. The lift arms attain their elevated position 20b. In this embodiment, a shaft operatively connected to the lift arm imparts torque to the lift arm thus raising the lift table 6 to the elevated position 13 as shown. The lift table remains level as it moves upwardly upon its pairs of legs 7 as before. The geometry of the lift arms allows them to extend over an edge of the bed 2 further rearwardly towards the pedestal mount P. The lift arms and the legs cooperate so that the lift table remains level during its entire range of motion.

Figure 9:
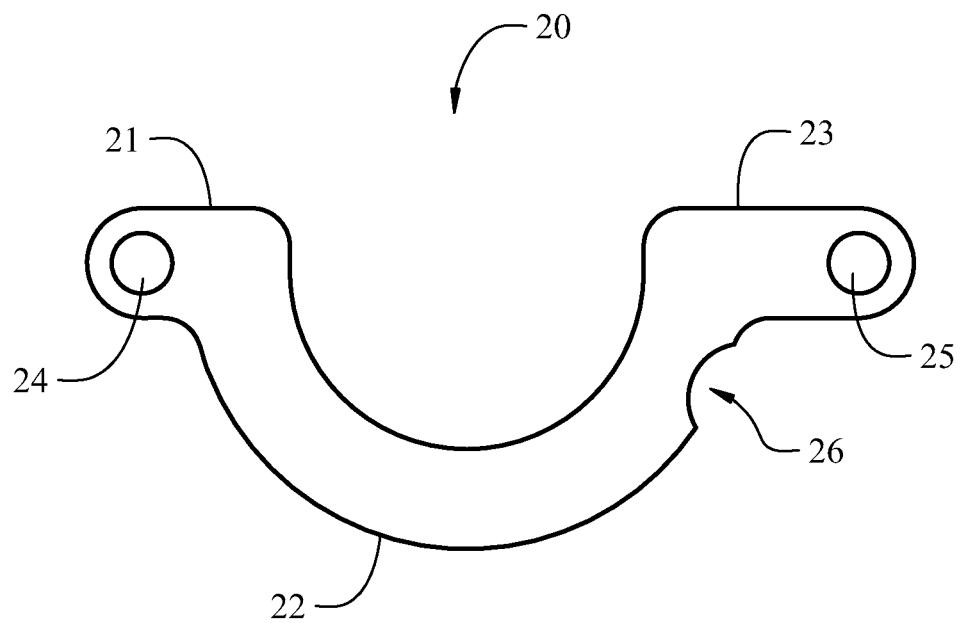

And, FIG. 9 shows a lift arm 20 in detail. The lift arm has a first tab 21 extending outwardly from a member 22. The member has a generally arcuate shape and joins to a second tab 23 generally opposite the first tab. The first tab, second tab, and member form an integral unit. The second tab extends outwardly from the member slightly more than the first tab. The first tab has a first aperture 24 that admits a hinge pin or a shaft (not shown) for connection to the frame rails R and the second tab has its second aperture 25 that admits a pin for connection to the lift table 6. The first tab and the second tab have a collinear orientation and generally form a flat base for the member 22. The first tab, second tab, and member cooperate in spanning approximately 180° of arc. Proximate the second tab, the member includes a notch 26 having a partially curved shape along the outer perimeter of the member. The notch accommodates nearby structure of the lift table 6 or the frame rails R when the lift arm occupies its elevated 20b or lowered 20a positions. The member generally has a semi-circular shape with a known radius. The member defines a semi-circular gap inside of the first tab and the second tab. The semi-circular gap has a diameter that admits the thickness of the bed 2 when the lift table and lift arm have attained their elevated positions as previously shown.

In use, the pull and lift system raises roofing materials and other cargo via the lift table 6 so as to eliminate excessive bending by a worker handling cargo, primarily roofing materials. The power to raise the lift table 6 to its raised position as at 13, FIGS. 2, 4 preferably comes from hydraulic rams 9 generally arranged in parallel and rotating about a common axis generally through the pivot point of the centered legs 7 at the level of the frame rails R. The hydraulic rams also allow a worker to stop the lift table at any position with the range of the rams 9. After arriving at a job site, a roofer has to unload cargo from the truck bed 2 onto a pedestal conveyor P. Unloading begins with moving the cargo from its position during transit to the conveyor. The worker begins with the pull bar 12 extended as at 14 in FIG. 1, then drags roofing material or cargo from the headboard 1a at the front of the truck bed to the lift table 6 at its lowered position 15 towards the rear of the truck bed 2, generally towards the pedestal mounted conveyor P. The rams 8 pulling upon both ends of the pull bar 12 provide an increased range of motion than the prior art. The rams allow an operator to stop the pull bar at any position within the extension range of the shafts 10. The dual rams also provide double the load capacity of prior art devices utilizing single rams. Additionally, the lift table through its rams 9 or lift arm 20 raises roofing material to a height above the bed 2 generally more than in prior art devices. The pull and lift system of the present invention may also utilize electric powered motors, pneumatic powered motors, a truck's power take-off system, a line from the truck's power steering pump, and like power sources available upon trucks.

The system of the invention transfers construction materials, such as palletized roofing, upon a flat bed truck, from a first position adjacent to a headboard of the truck and upon the bed to a second position rearwardly of the headboard of the truck and elevated above the bed. The system includes a pull bar and two rams. The pull bar extends transversely on the bed and has a first extended position at the first position and a second retracted position on the bed rearwardly from the headboard of the truck where the second retracted position is longitudinally spaced on the bed away from the headboard. The pull bar has a height approximately that of a pallet and a generally L shaped cross section to engage an edge of a pallet. The rams are mutually parallel and spaced apart, move parallel to the plane of the bed and fit within the bed. The rams move the pull bar from the first extended position to the second retracted position while the rams connect below the pull bar so it remains upon the bed during usage. Preferably, the rams operate simultaneously and the pull bar travels perpendicular to the rams. The pull bar also travels in a range from proximate the headboard of the truck to proximate the center of the length of the bed. While the rams permit the pull bar to stop at any position in the range of the pull bar travels.

The system of the invention also has a lift table, one or more pairs of legs, and an elevating assembly. The lift table extends transverse the bed with less width and less length than the truck bed. The lift table has a centered position along the length of the bed while the lift table maintains cargo parallel to the bed during usage. More particularly, the lift table has a first lowered position coplanar with the bed and a second elevated position above the bed and rearwardly from the headboard. The legs connect the lift table to the bed so the legs rotate from being within the bed as the lift table is in the first lowered position to being perpendicular to the bed as the lift table is in the second elevated position. The elevating assembly locates beneath the bed and operatively connects to the lift table so the elevating assembly raises and lowers the lift table between the first lowered position and the second elevated position. The elevating assembly has at least one strut locating beneath the bed generally perpendicular to the length of the bed. The assembly also has at least one single stage ram pivotally connecting to the strut and to the lift table, the ram raising the lift table vertically from the first lowered position to the second elevated position. The ram connects to the lift table rearwardly of the legs so the legs rotate from generally parallel to the bed to perpendicular to the bed as the lift table moves from the first lowered position to the second elevated position. The elevating assembly may also have a pair of lift arms pivotally connecting to the lift table and to frame rails of the truck so the lift arms rotate about an axis perpendicular to the length of the bed. Each of the lift arms has a generally arcuate member with a first tab and an opposite second tab, so the first tab pivotally connects to the frame rails of the truck and the second tab to the lift table. Each of the members avoids contacting the bed as the lift table extends slightly over the bed to the rear of the truck. Each member then has a notch proximate the second tab that also avoids contacting the lift table. More particularly, the first tabs of the lift arms operatively connect to a power source that can be a hydraulic motor, a pneumatic motor, an electric motor, a hydraulic assembly and the like. The hydraulic assembly has at least one strut locating beneath the bed generally perpendicular to the length of the bed and at least one single stage ram.

The present invention may also have a lift table, a pull bar, a pull bar transfer means, and a lift table elevating means. The lift table locates within the bed, has spaced apart supporting legs locating towards the front of the bed, and is parallel to the bed and away from the headboard. The pull bar extends transverse of the truck bed and has a first extended position at a first position adjacent to a headboard of the bed and a second retracted position on the bed adjacent to the lift table. The first extended and second retracted position longitudinally spaced on the truck bed from the headboard. The means for transferring the pull bar moves it from the first position to the second position without detaching from the pull bar. The transferring means locates within the bed while avoiding interference with it. The means for elevating the lift table from the second position to a third position does so without tipping the cargo or materials. The third position has a higher elevation with respect to the second position and the truck bed, and the elevating means extends upwardly from a location within the truck bed. The transfer means includes two mutually parallel spaced apart single stage hydraulic rams and the elevating means includes two mutually parallel spaced apart single stage hydraulic rams rotating about a common axis. Alternatively, the transfer means includes two mutually parallel spaced apart single stage hydraulic rams, and the elevating means includes additional components. The elevating means may have a pair of lift arms pivotally connecting to the lift table and to the frame rails of a truck, the lift arms rotating about an axis perpendicular to the length of the bed. Each of the lift arms has a generally arcuate member with a first tab and an opposite second tab, the first tab pivotally connects to frame rails of the truck and the second tab to the lift table. Each of the members avoids contacting the bed as the lift table extends slightly over the bed towards the pedestal mount. The members also have a notch proximate the second tab that also avoids contacting the lift table. The invention once more may have power from an electric motor, a power take off system of the truck, and a power steering system of the truck.

From the aforementioned description, a pull and lift system has been described. The pull and lift system is uniquely capable of dragging cargo smoothly upon a bed and then lifting that cargo to a working elevation proximate a pedestal conveyor reducing bending required of a worker handling the cargo. The pull and lift system also maintains the cargo level when dragging and lifting it. The present invention allows workers, primarily roofers, to pull pallets of stacked roofing materials towards a conveyor and lift the pallets as the roofers unload bundles of shingles or other roofing upon the conveyor. The pull and lift system and its various components may be manufactured from many materials, including but not limited to, steel, aluminum, polymers, nylon, polyvinyl chloride, high density polyethylene, polypropylene, ferrous and non-ferrous metals, their alloys, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A system for transferring construction materials, such as palletized roofing, upon a flat bed truck, from a first position adjacent to a headboard of the truck and upon the bed to a second position rearwardly of the headboard of the truck and elevated above the bed, comprising:
   a lift table extending transverse to said bed, said lift table having less width and less length than said truck flat bed, said lift table being positioned approximately in the center of the length of the bed, and said lift table maintaining the construction materials parallel to the bed during usage;
   said lift table having a first lowered position coplanar with the bed and a second elevated position above the bed and rearwardly from the headboard;
   at least one pair of legs pivotally connecting said lift table to said bed wherein said at least one pair of legs rotate from being within the bed as said lift table is in said first lowered position to being perpendicular to the bed as said lift table is in said second elevated position;
   an elevating assembly locating beneath the bed operatively connecting to said lift table wherein said elevating assembly raises and lowers said lift table between said first lowered position and said second elevated position;
   said elevating assembly having a pair of lift arms pivotally connecting to said lift table and adapted to pivotally connect to frame rails of the truck, said pair of lift arms rotating about an axis perpendicular to the length of the bed;
   each of said lift arms having a generally arcuate member with a first tab and an opposite second tab, said first tab is adapted to pivotally connect to frame rails of the truck and said second tab pivotally connecting to said lift table;
   each of said members avoiding contacting the bed as said lift table extends slightly over said bed rearwardly;
   each of said members having a notch proximate said second tab wherein said notch avoids contacting said lift table when in said second elevated position and is adapted to avoid contacting the truck bed when in said first lowered position;
   said first tabs of said lift arms operatively connecting to a power source; and
   said power source being one of a hydraulic motor, a pneumatic motor, an electric motor, and a hydraulic assembly wherein said hydraulic assembly includes at least one strut locating beneath said bed generally perpendicular to the length of the bed and at least one single stage ram.

2. A system for transferring construction materials, such as palletized roofing, upon a flat bed truck, from a first position adjacent to a headboard of the truck and upon the bed to a second position rearwardly of the headboard of the truck and elevated above the bed, comprising:
   a lift table locating within the bed, said lift table having spaced apart supporting legs locating towards the front of the bed, said lift table being parallel to said bed and away from the headboard;
   a pull bar extending transversely on the truck bed having a first extended position at the first position adjacent to the headboard of the bed and a second retracted position on the bed adjacent to said lift table, and longitudinally spaced on said truck bed from the headboard;
   means for transferring said pull bar from said first position to said second position without detaching from said pull bar and said means for transferring locating within the bed while avoiding interference with the bed, said means for transferring including a first set of two mutually parallel spaced apart single stage hydraulic rams, said rams connecting to said pull bar and remaining connected to said pull bar during movement from said first extended position to said second retracted position; and,
   means for elevating the lift table from said second position rearwardly of the headboard of the truck to a third position without tipping the materials, said third position being elevated with respect to said second position and said truck bed, and said means for elevating extending from a location within the truck bed, said means for elevating including a second set of two mutually parallel spaced apart single stage hydraulic rams rotating about a common axis;

said elevating means further including a pair of lift arms pivotally connecting to said lift table and adapted to pivotally connect to frame rails of the truck, said lift arms rotating about an axis perpendicular to the length of the bed;

each of said lift arms having a generally arcuate member with a first tab and an opposite second tab, said first tab is adapted to pivotally connect to frame rails of the truck and said second tab pivotally connecting to said lift table;

each of said members avoiding contacting the bed as said lift table extends slightly over said bed rearwardly; and, each of said members having a notch proximate said second tab wherein said notch avoids contacting said lift table when elevated and is adapted to avoid contacting the truck bed when in said first lowered position.

* * * * *